(12) United States Patent
Sakata et al.

(10) Patent No.: US 10,077,361 B2
(45) Date of Patent: Sep. 18, 2018

(54) SURFACE PHYSICAL PROPERTY MODIFIER COMPOSITION, THERMOPLASTIC RESIN COMPOSITION CONTAINING SAME, AND RESIN MOLDED ARTICLE THEREFROM

(71) Applicant: NOF CORPORATION, Tokyo (JP)

(72) Inventors: Yusuke Sakata, Aichi (JP); Tomohisa Tasaka, Aichi (JP)

(73) Assignee: NOF CORPORATION, Tokyo (JP)

( * ) Notice: Subject to any disclaimer, the term of this patent is extended or adjusted under 35 U.S.C. 154(b) by 0 days.

(21) Appl. No.: 15/516,910

(22) PCT Filed: Oct. 6, 2015

(86) PCT No.: PCT/JP2015/078272
§ 371 (c)(1),
(2) Date: Apr. 5, 2017

(87) PCT Pub. No.: WO2016/056528
PCT Pub. Date: Apr. 14, 2016

(65) Prior Publication Data
US 2017/0306151 A1   Oct. 26, 2017

(30) Foreign Application Priority Data
Oct. 10, 2014 (JP) .................. 2014-208650

(51) Int. Cl.
| | | |
|---|---|---|
| C08K 5/01 | (2006.01) | |
| C08L 23/06 | (2006.01) | |
| C08L 25/04 | (2006.01) | |
| C08L 33/02 | (2006.01) | |
| C08L 33/14 | (2006.01) | |
| C08L 33/20 | (2006.01) | |
| C08L 55/02 | (2006.01) | |
| C08L 69/00 | (2006.01) | |
| C08L 91/06 | (2006.01) | |

(52) U.S. Cl.
CPC ............... *C08L 91/06* (2013.01); *C08K 5/01* (2013.01); *C08L 23/06* (2013.01); *C08L 25/04* (2013.01); *C08L 33/02* (2013.01); *C08L 33/14* (2013.01); *C08L 33/20* (2013.01); *C08L 55/02* (2013.01); *C08L 69/00* (2013.01); *C08L 2201/02* (2013.01); *C08L 2205/03* (2013.01)

(58) Field of Classification Search
CPC .......... C08L 91/06; C08L 69/00; C08L 55/02; C08L 2201/02; C08L 2205/03; C08L 23/06; C08L 25/04; C08L 33/02; C08L 33/14; C08L 33/20; C08K 5/01
See application file for complete search history.

(56) References Cited

U.S. PATENT DOCUMENTS

| | | | | |
|---|---|---|---|---|
| 3,450,654 A | * | 6/1969 | Ramos | ............... C08G 59/5033 528/124 |
| 2008/0242779 A1 | | 10/2008 | Gaggar et al. | |
| 2011/0092642 A1 | | 4/2011 | Kurihara | |
| 2013/0209774 A1 | * | 8/2013 | Shirodkar | ............... C08L 23/06 428/220 |
| 2015/0210842 A1 | | 7/2015 | Sakata et al. | |
| 2015/0210851 A1 | | 7/2015 | Tajima | |

FOREIGN PATENT DOCUMENTS

| | | |
|---|---|---|
| JP | 06262679 | 9/1994 |
| JP | H10-101920 A | 4/1998 |
| JP | 2009-167352 A | 7/2009 |
| JP | 2009167352 | 7/2009 |
| JP | 2012-001683 A | 1/2012 |
| JP | 2012-036263 A | 2/2012 |
| JP | 2012036263 A | 2/2012 |
| JP | 2013-053306 A | 3/2013 |
| JP | 2013053306 A | 3/2013 |
| WO | 2009/154152 A1 | 12/2009 |
| WO | 2014/038500 A1 | 3/2014 |
| WO | 2014038500 A1 | 3/2014 |

OTHER PUBLICATIONS

PCT International Search Report dated Nov. 2, 2015 for PCT International Patent Application No. PCT/JP2015/078272, 5 pages.
PCT Written Opinion dated Nov. 2, 2015 for PCT International Patent Application No. PCT/JP2015/078272, 4 pages.
European Search Report dated May 7, 2018 in connection with European Patent Application No. 15849288.4.

* cited by examiner

*Primary Examiner* — Patrick D Niland
(74) *Attorney, Agent, or Firm* — Amster, Rothstein & Ebenstein LLP

(57) ABSTRACT

A surface physical property modifier composition includes (A) a wax, (B) a vinyl (co)polymer, and (C) an aliphatic hydrocarbon having a carbon number of 5 to 14. Component (A) is set to be at least one selected from the group consisting of (a1) paraffin wax, (a2) microcrystalline wax, (a3) Fischer-Tropsch wax, and (a4) polyethylene wax, and component (B) is produced from at least one of (b1) a (meth)acrylonitrile, (b2) a (meth)acrylic acid having a carbon number of 1 to 4, (b3) a hydroxyethyl (meth)acrylate or hydroxypropyl (meth)acrylate, (b4) styrene, and (b5) predetermined (meth)acrylic acid alkyl esters. Component (A) is 50 to 98 parts by mass relative to 100 parts by mass of the total of (A) and (B), and component (C) is 0.001 to 1 percent by mass relative to the total amount of (A).

4 Claims, No Drawings

SURFACE PHYSICAL PROPERTY MODIFIER COMPOSITION, THERMOPLASTIC RESIN COMPOSITION CONTAINING SAME, AND RESIN MOLDED ARTICLE THEREFROM

CROSS-REFERENCE TO RELATED APPLICATIONS

This application is a U.S. national stage entry under 35 U.S.C. § 371 of PCT International Patent Application No. PCT/JP2015/078272, filed Oct. 6, 2015, which claims priority to Japanese Patent Application No. 2014-208650, filed Oct. 10, 2014, the contents of which are incorporated by reference herein into the subject application.

TECHNICAL FIELD

The present invention relates to a surface physical property modifier composition, a thermoplastic resin composition containing the same, and a resin molded article therefrom.

BACKGROUND ART

Polycarbonate (PC)/acrylonitrile-butadiene-styrene copolymer (ABS) is a thermoplastic resin mixture having excellent impact resistance, moldability, and flame retardancy and, therefore, is broadly applicable to large injection-molded products, e.g., automobile parts and housings of computers, business machines, and electric appliances, which dissipate much heat. In recent years, the range of application thereof has increased. On the other hand, PC/ABS has a problem in that an anti-scratch property is poor and squeak noise occurs easily when rubbing against another member.

Japanese Unexamined Patent Application Publication No. 10-101920 discloses a technology to improve the tribological property of PC/ABS by adding any one of low-molecular-weight polyolefin, silicone oil, and silicone resin fine particles to PC/ABS.

Japanese Unexamined Patent Application Publication No. 2013-53306 discloses a technology to improve the anti-scratch property of polypropylene (PP) by adding a composition of hydrocarbon-based wax and a vinyl copolymer containing a polyorganosiloxane group to PP.

However, the method described in Japanese Unexamined Patent Application Publication No. 10-101920 has a problem in that the compatibility of PC and ABS with a lubricating component is poor, appearance is degraded, and the surface is sticky. Further, a reduction in the coefficient of dynamic friction of PC/ABS is described but there is no description on an improvement in anti-scratch property or a reduction in squeak noise.

In Japanese Unexamined Patent Application Publication No. 2013-53306, there is a description of improved the anti-scratch property of PP due to the composition, but there is no description on the exertion of the effects of the composition on the PC/ABS resin or a reduction in squeak noise.

SUMMARY OF INVENTION

Technical Problem

Accordingly, the present invention solves the above-described problems, and it is an object to provide a surface physical property modifier from which a resin molded article having good molded article appearance and having excellent effects of improving an anti-scratch property and reducing squeak noise can be molded, a thermoplastic resin composition containing the same, and the resin molded article.

Solution to Problem

According to a feature of the present invention, a surface physical property modifier composition includes (A) a wax, (B) a vinyl (co)polymer, and (C) an aliphatic hydrocarbon having a carbon number of 5 to 14, wherein component (A) is at least one selected from the group consisting of (a1) paraffin wax, (a2) microcrystalline wax, (a3) Fischer-Tropsch wax, and (a4) polyethylene wax, component (B) is produced by radical polymerization of at least one vinyl monomer selected from the group consisting of (b1) a (meth)acrylonitrile, (b2) a (meth)acrylic acid having a carbon number of 1 to 4, (b3) a hydroxyethyl (meth)acrylate or hydroxypropyl (meth)acrylate, (b4) styrene, and (b5) (meth)acrylic acid alkyl esters denoted by formula (1) below, component (A) is 50 to 98 parts by mass relative to 100 parts by mass of the total of component (A) and component (B), and component (C) is 0.001 to 1 percent by mass relative to the total amount of component (A)

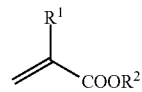

formula (1)

($R^1$: H or $CH_3$ and $R^2$: a straight chain or branched hydrocarbon group having a carbon number of 1 to 4).

According to another feature of the present invention, a surface physical property modifier composition includes (A) a wax, (B) a vinyl copolymer, and (C) an aliphatic hydrocarbon having a carbon number of 5 to 14, wherein component (A) is at least one selected from the group consisting of (a1) paraffin wax, (a2) microcrystalline wax, (a3) Fischer-Tropsch wax, and (a4) polyethylene wax, component (B) is a vinyl copolymer produced by radical polymerization of at least one vinyl monomer selected from the group consisting of (b1) a (meth)acrylonitrile, (b2) a (meth)acrylic acid having a carbon number of 1 to 4, (b3) a hydroxyethyl (meth)acrylate or hydroxypropyl (meth)acrylate, (b4) styrene, and (b5) (meth)acrylic acid alkyl esters denoted by formula (1) below and (b6) a vinyl monomer having a polyorganosiloxane group and a vinyl group at one or more ends of the molecule, component (A) is 50 to 98 parts by mass relative to 100 parts by mass of the total of component (A) and component (B), component (C) is 0.001 to 1 percent by mass relative to the total amount of component (A), and the proportion of the monomer (b6) in component (B) is 1 to 30 percent by mass

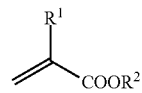

formula (1)

($R^1$: H or $CH_3$ and $R^2$: a straight chain or branched hydrocarbon group having a carbon number of 1 to 4).

According to another feature of the present invention, a thermoplastic resin composition contains 0.1 to 20 parts by mass of the above-described surface physical property modifier composition relative to 100 parts by mass of thermoplastic resin composed of 5 to 95 parts by mass of polycarbonate resin (PC) and 5 to 95 parts by mass of acrylonitrile-butadiene-styrene copolymer resin (ABS).

According to another feature of the present invention, a resin molded article is produced by molding the above-described thermoplastic resin composition into a predetermined shape.

According to the surface physical property modifier composition of the present invention, adding the surface physical property modifier composition to the PC/ABS resin can easily provide the PC/ABS resin with the performance to resist scratching and the performance to reduce squeak noise. In this regard, in the case where this type of lubricant is added to the PC/ABS resin, in general, the molding appearance of the PC/ABS resin molded article tends to be degraded or the surface tends to become sticky. However, according to the surface physical property modifier composition of the present invention, the PC/ABS resin molded article can be provided with good performance to resist scratching and good performance to reduce squeak noise without degrading the molding appearance. In particular, component (C) has a function of further improving the lubricating property of (A), a wax, and, thereby, the smoothness of the surface of the PC/ABS resin molded article can be improved. Consequently, a resin molded article having a good molded article appearance and having excellent effects of improving an anti-scratch property and reducing squeak noise can be produced. Also, the monomer (b6) has a surface orientation and a lubricating property. Therefore, in the case where the monomer (b6) is further contained, the surface physical property modifier composition can be finely dispersed on the surface of the PC/ABS resin molded article and the smoothness of the surface of the PC/ABS resin molded article can be further improved.

DESCRIPTION OF EMBODIMENTS

The present invention will be described below. In this regard, in the present disclosure, "◯◯ to xx" denoting the range of a numerical value refers to "◯◯ or more and xx or less" unless otherwise specified. Also, "(A), a wax," in the present invention is a concept including a "wax mixture" that contains slight amounts of component (C) as a secondary component. Therefore, the content of component (C) includes the amount originally contained in component (A). Also, "(co)polymer" is a concept including a polymer composed of a single vinyl monomer and a copolymer composed of at least two types of vinyl monomers. Also, "(meth) acrylic acid" denotes the inclusion of both methacrylic acid and acrylic acid. Likewise, "(meth)acrylonitrile" denotes the inclusion of both methacrylonitrile and acrylonitrile.

<<Surface Physical Property Modifier Composition>>

A surface physical property modifier composition according to the present invention includes (A), a wax, (B), a vinyl (co)polymer, and (C), an aliphatic hydrocarbon having a carbon number of 5 to 14.

<(A) Wax>

The wax of (A) is a compound that can realize low frictional properties and the like and has a main function of improving the surface smoothness of the PC/ABS resin molded article. Hydrocarbon components which are solid at 25° C. and 1 atmosphere and have a carbon number of 20 to 80 can be used as the wax. Specifically, at least one or at least two selected from the group consisting of (a1) paraffin wax and (a2) microcrystalline wax refined from petroleum, (a3) Fischer-Tropsch wax synthesized from natural gas, and (a4) polyethylene wax synthesized from ethylene can be used.

In this regard, (a1) paraffin wax, (a2) microcrystalline wax, and (a3) Fischer-Tropsch wax are wax mixtures containing these wax components as primary components and, in addition, slightly containing (about 0.01 to 0.9 percent by mass) component (C), described later, as a secondary component. On the other hand, (a4) polyethylene wax is pure wax composed of only polyethylene wax.

<(B) Vinyl (Co)Polymer>

The vinyl (co)polymer of (B) has functions of making (A), the wax, and PC/ABS compatible with each other and finely dispersing (A), the wax, into PC/ABS. The vinyl (co)polymer of (B) is a (co)polymer produced by radical polymerization of at least one or at least two vinyl monomers selected from the group consisting of (b1) a (meth) acrylonitrile, (b2) a (meth)acrylic acid, (b3) a hydroxyethyl (meth)acrylate or hydroxypropyl (meth)acrylate, (b4) styrene, and (b5) (meth)acrylic acid alkyl esters denoted by formula (1) below. Importantly, a copolymer of (b1) a (meth)acrylonitrile and (b4) styrene is preferable from the viewpoint of anti-scratch property.

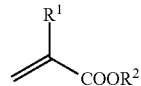

formula (1)

($R^1$: H or $CH_3$ and $R^2$: a straight chain or branched hydrocarbon group having a carbon number of 1 to 4)

Also, it is preferable that a copolymer produced by radical polymerization of (b6) a vinyl monomer having a polyorganosiloxane group and a vinyl group at one or more ends of the molecule and at least one selected from the group consisting of the vinyl monomers (b1) to (b5) be used as (B), the vinyl (co)polymer. The above-described vinyl monomer (b6) has a polyorganosiloxane group and, thereby, can improve the surface orientation of (B), the vinyl (co)polymer, to a great extent. Consequently, (A), the wax, made to be compatible by (B), the vinyl (co)polymer, also has a surface orientation and, thereby, the lubricating property of the surface of the PC/ABS resin molded article can be improved. Further, polyorganosiloxane itself has a lubricating property and, therefore, (B), the vinyl (co)polymer, produced by copolymerization of the vinyl monomer (b6) is provided with the lubricating property. As a result, the smoothness of the surface of the PC/ABS resin molded article can be improved to a great extent.

Examples of the vinyl monomer (b6) include product names: X-22-164, X-22-164AS, X-22-164A, X-22-164B, X-22-164C, X-22-164E, X-22-2445, X-22-1602, X-22-174ASX, X-22-174BX, X-22-2426, X-22-2475, and KF-2012 of Shin-Etsu Chemical Co., Ltd., and product names: Silaplane FM-0711, Silaplane FM-0721, and Silaplane FM-0725 of JNC CORPORATION. Importantly, X-22-174ASX, X-22-174BX, X-22-2426, X-22-2475, KF-2012, Silaplane FM-0711, Silaplane FM-0721, and Silaplane FM-0725, in which only one end has been (meth) acryl-modified, are preferable. One of these vinyl monomers (b6) may be used alone, or two or more can be used in combination.

<Radical Polymerization Initiator>

The vinyl monomers (b1) to (b6) are subjected to radical polymerization by using radical polymerization initiators. Azo polymerization initiators, organic peroxides, persulfates, aqueous hydrogen peroxide, redox polymerization initiators (polymerization initiators produced by combining oxidizing agents and reducing agents) can be used as the radical polymerization initiators.

Examples of azo polymerization initiators include azobisisobutyronitrile, azobisisovaleronitrile, azobisdimethylvaleronitrile, azobis(4-methoxy-2,4-dimethylvaleronitrile, and 1-phenylethylazodiphenylmethane.

Examples of organic peroxides include peroxyketals, e.g., 1-di(t-hexylperoxy)-3,3,5-trimethylcyclohexane and 1,1-di(t-hexylperoxy)cyclohexane, hydroperoxides, e.g., p-menthane hydroperoxide, diisopropylbenzene hydroperoxide, 1,1,3,3-tetramethylbutyl hydroperoxide, cumene hydroperoxide, and t-butyl hydroperoxide, diacyl peroxides, e.g., di(3,5,5-trimethylhexanoyl) peroxide and dibenzoyl peroxide, and peroxy esters, e.g., cumylperoxy neodecanoate and t-butylperoxy neodecanoate.

Hydroperoxides and persulfates can be used as the oxidizing agents used for the redox polymerization initiators. Examples of hydroperoxides include cumene hydroperoxide, t-butyl hydroperoxide, diisopropylbenzene hydroperoxide, p-menthane hydroperoxide, and 1,1,3,3-tetramethylbutyl hydroperoxide. Examples of persulfates include potassium persulfate and ammonium persulfate. Examples of reducing agents include glucose, dextrose, formaldehyde sodium sulfoxylate (Rongalite), sodium thiosulfate, ferrous sulfate, copper sulfate, and potassium hexacyanoferrite(III).

Among the above-described radical polymerization initiators, di(3,5,5-trimethylhexanoyl) peroxide and potassium persulfate are preferable from the viewpoint of ease of handling and ease of controlling the polymerization reaction.

<Method for Manufacturing (B) Vinyl (Co)Polymer>

The vinyl (co)polymer of (B) can be synthesized by a known suspension polymerization method or emulsion polymerization method using a radical polymerization initiator. At this time, in the case where the monomer (b6) is used with at least one selected from the group consisting of vinyl monomers (b1) to (b5), mixing is performed such that the content of the monomer (b6) becomes 1 to 30 percent by mass relative to the total amount (100 percent by mass) of (B), the vinyl (co)polymer. If the proportion of the monomer (b6) mixed (content) is 31 percent by mass or more, the surface physical properties of the resulting PC/ABS resin molded article are degraded.

In this regard, the ratio (content) of the radical polymerization initiator is preferably 0.001 to 10 parts by mass, and more preferably 0.01 to 5 parts by mass relative to the total amount of the monomers of 100 parts by mass. A content of the radical polymerization initiator of less than 0.001 parts by mass is not preferable because not only is a long time required to complete the polymerization, but also the reaction is not completed. On the other hand, if the content is more than 10 parts by mass, heat generation increases and control of the polymerization reaction tends to become difficult.

In the case where the synthesis is performed by the emulsion polymerization method, a surfactant is mixed with the monomers. Regarding the surfactant used for the emulsion polymerization, a known nonionic, anionic, or cationic surfactant can be used. In the case where a polymer is removed by salting out, an anionic surfactant is preferable. Examples of anionic surfactants include fatty acid salts, sodium alkylbenzene sulfonates, alkylnaphthalene sulfonates, dialkylsulfosuccinic acid ester salts, alkylphosphoric acid ester salts, naphthalenesulfonic acid formalin condensates, and polyoxyethylene alkylsulfuric acid ester acids. These surfactants may be mixed in a proportion of about 0.1 to 10 parts by mass, and preferably 0.1 to 5 parts by mass relative to the total amount of the monomers (b1) to (b6) of 100 parts by mass.

At the time of emulsion polymerization, known pH regulators, chelating agents, polymerization controlling agents, polymerization stabilizers, and the like can be added, as necessary. Examples thereof include pH regulators, e.g., sodium hydroxide, potassium hydroxide, ammonium hydroxide, sodium hydrogen carbonate, sodium carbonate, and disodium hydrogen phosphate, chelating agents, e.g., sodium ethylenediaminetetraacetate and sodium pyrophosphate, viscosity adjustors or polymerization stabilizers composed of inorganic electrolytes, organic electrolytes, high-molecular-weight electrolytes, or the like. Further, in order to control the degree of polymerization, known cross-linking agents, chain transfer agents, polymerization inhibitors, and the like can also be added.

After the polymerization is completed, an emulsion resulting from the emulsion polymerization is subjected to, for example, salting out by using acids, e.g., hydrochloric acid, sulfuric acid, and nitric acid, or electrolytes, e.g., sodium chloride, potassium chloride, sodium sulfate, calcium chloride, magnesium sulfate, copper sulfate, and calcium nitrate, and to filtration and drying so as to produce a copolymer.

Meanwhile, in the case where the synthesis is performed by the suspension polymerization method, a dispersing agent is mixed with the monomers. Examples of inorganic compounds serving as the dispersing agent include tribasic calcium phosphate, magnesium phosphate, aluminum phosphate, zinc phosphate, calcium carbonate, magnesium carbonate, calcium hydroxide, magnesium hydroxide, aluminum hydroxide, calcium metasilicate, calcium sulfate, barium sulfate, bentonite, silica, alumina, magnetic substances, and ferrite. Also, examples of organic compounds include polyvinyl alcohol, gelatin, methyl cellulose, methylhydroxypropyl cellulose, ethyl cellulose, sodium salts of carboxymethyl cellulose, and starch. The ratio of dispersing agent may be about 0.01 to 10 parts by mass, and preferably about 0.01 to 5 parts by mass relative to the total amount of the monomers of 100 parts by mass. Then, after the suspension polymerization is completed, filtration and drying are performed so as to produce a (co)polymer.

The number average molecular weight (Mn) of (B), the vinyl (co)polymer, synthesized by radical polymerization of the monomers is usually 1,000 to 6,000,000, and preferably 10,000 to 4,000,000. If the number average molecular weight is less than 1,000, the heat resistance of the vinyl (co)polymer tends to be degraded. If the number average molecular weight is more than 6,000,000, the fluidity of a molten vinyl (co)polymer is degraded and the moldability tends to be degraded.

Therefore, a molecular weight regulator is preferably added to the surface physical property modifier composition, as necessary. Examples of the molecular weight regulator include alkyl mercaptans, e.g., N-dodecyl mercaptan and phenyl mercaptan, halogenated alkyls, e.g., α-methylstyrene dimer and carbon tetrachloride, and alcohols, e.g., isopropyl alcohol.

<Aliphatic Hydrocarbon Having a Carbon Number of 5 to 14>

The aliphatic hydrocarbon having a carbon number of 5 to 14 of (C) is a hydrocarbon component which is liquid at 25° C. and 1 atmosphere and which has a function of further improving the lubricating property of (A), the wax. Specific examples of (C), an aliphatic hydrocarbon having a carbon number of 5 to 14, include pentane, isopentane, hexane, isohexane, heptane, octane, nonane, decane, undecane, dodecane, tridecane, and tetradecane. One of these aliphatic hydrocarbons having a carbon number of 5 to 14 of (C) may be used alone, or two or more may be used as a mixture.

The content of component (C) is set to be 0.001 to 1 percent by mass relative to the total amount (100 percent by mass) of (A), the wax (mixture). If the content is out of this range, the surface physical properties of the resulting PC/ABS resin molded article are degraded. In this regard, the content of component (C) includes the amount originally contained in (A), the wax.

The surface physical property modifier composition according to the present invention can be produced by mixing (A), the wax, and (B), the vinyl (co)polymer, at a temperature higher than or equal to the melting temperature of (A), the wax. At this time, (B), the vinyl (co)polymer, may be produced and, thereafter, be mixed with (A), the wax, or (A), the wax, and vinyl monomers (b1) to (b6) may be put into the same container so as to produce (B), the vinyl (co)polymer, in the presence of (A), the wax. Alternatively, the surface physical property modifier composition according to the present invention may be in the form of a graft copolymer or block copolymer in which (A), the wax, and (B), the vinyl (co)polymer, are bonded to each other by covalent bonding. The graft copolymer or block copolymer is obtained by putting (A), the wax, and vinyl monomers (b1) to (b6) into the same container and producing (B), the vinyl (co)polymer, in the presence of (A), the wax.

Regarding the proportions of (A), the wax, and (B), the vinyl (co)polymer, mixed (contents), (A), the wax, is set to be 50 to 98 parts by mass (in other words, (B), the vinyl (co)polymer, is 50 to 2 parts by mass) relative to (A)+(B)=100 parts by mass. If (A), the wax, is less than 50 parts by mass, the amount of lubricant decreases and, thereby, the surface smoothness of the resulting PC/ABS resin molded article is degraded.

<<Thermoplastic Resin Composition>>

The thermoplastic resin composition according to the present invention can be produced by adding the above-described surface physical property modifier composition serving as an additive (lubricant) to a resin mixture of a polycarbonate resin (PC) and an acrylonitrile-butadiene-styrene copolymer resin (ABS) and melt-kneading these.

<Polycarbonate Resin (PC)>

The polycarbonate resin (PC) needs only to be an aromatic polycarbonate produced by a known phosgene method, melting method, or the like. Specific manufacturing methods are described in, for example, Japanese Unexamined Patent Application Publication No. 63-215763 and Japanese Unexamined Patent Application Publication No. 2-124934. Typical examples of a diphenol used as a raw material include 2,2-bis(4-hydroxyphenyl)propane (so-called bisphenol A). Also, examples of precursors for introducing carbonates include phosgene and diphenyl carbonate. The resulting polycarbonate resin (PC) can be used in both the case where an OH group at an end is terminated and the case where an OH group at an end is not terminated.

<Acrylonitrile-Butadiene-Styrene Copolymer Resin (ABS)>

The acrylonitrile-butadiene-styrene copolymer resin (ABS) primarily contains a copolymer primarily composed of three components of acrylonitrile, butadiene, and styrene, and resins produced by known methods, for example, a resin produced by radical polymerization of acrylonitrile and styrene in the presence of butadiene, can be used.

<Mixing Ratio>

The thermoplastic resin composition according to the present invention contains 0.1 parts by mass to 20 parts by mass, and preferably 1 to 20 parts by mass of surface physical property modifier composition relative to 100 parts by mass of thermoplastic resin composed of 5 to 95 parts by mass of polycarbonate resin (PC) and 5 to 95 parts by mass of acrylonitrile-butadiene-styrene copolymer resin (ABS). In the case where the surface physical property modifier composition is less than 0.1 parts by mass relative to 100 parts by mass of thermoplastic resin, a sufficient anti-scratch property and an effect of reducing squeak noise cannot be attained. On the other hand, in the case where the surface physical property modifier composition is more than 20 parts by mass relative to 100 parts by mass of thermoplastic resin, the molding appearance of the resulting thermoplastic resin molded article is degraded. Incidentally, regarding the ratio of PC to ABS, any ratio within the range of PC:ABS=95:5 to 5:95 may be adopted in accordance with the use of a final molded article.

Resin additives, e.g., antioxidants, ultraviolet absorbers, flame retardants, mold release agents, surfactants, lubricants, plasticizers, coloring agents, antimicrobial agents, dispersing agents, fillers, and glass fibers, can be added to the thermoplastic resin composition according to the present invention within the bounds of not impairing the effects of the present invention. These may be used alone or at least two may be used in combination.

<Method for Manufacturing Thermoplastic Resin Composition>

When the thermoplastic resin composition according to the present invention is produced, the thermoplastic resin composition may be produced by melt-kneading PC, ABS, and the surface physical property modifier composition at the same time, or the thermoplastic resin composition may be produced by melt-kneading PC and ABS so as to obtain a PC/ABS thermoplastic resin in advance and, thereafter, performing melt-kneading with the surface physical property modifier composition. The PC/ABS thermoplastic resin, in which PC and ABS have been subjected to melt-kneading in advance, is commercially available, and examples thereof include Bayblend T65XF 901510 produced by Bayer and Bayblend T85XF 901510. Regarding a melt-kneading method, known melt-kneading method, e.g., a single screw extruder, a twin screw extruder, a Banbury mixer, a kneader, and a roll, are adopted.

<<Resin Molded Article>>

The resin molded article according to the present invention is produced by molding the above-described thermoplastic resin composition into a predetermined shape, and the effects of the surface physical property modifier composition contained in the thermoplastic resin composition are realized. There is no particular limitation regarding the form of the resin molded article and the form may be the shape of a sheet, a film, a hollow body, a block body, a tabular body, a tubular body, a complicated body, or the like. There is no particular limitation regarding the molding method as long as the method is a common method for molding the thermoplastic resin, and examples include an extrusion molding method, an injection molding method, a blow molding method, a foam molding method, a calender molding method, an air-pressure forming method, a hot forming method, a vacuum forming method, and a powder slush molding method. The resin molded article can be used for various products and half-finished goods in wide fields of automobile parts, home-appliance parts, sundry goods, and the like because of excellent surface physical property modifying effects.

EXAMPLES

Specific examples according to the present invention will be described below, but the present invention is not limited to these.

(Surface Physical Property Modifier Composition)

Each of (A), the wax (mixture), shown in Table 1 in a ratio shown in Table 3, vinyl monomers (b1) to (b6) shown in Table 2 in a ratio shown in Table 3, and (C), the hydrocarbon, shown in Table 3 in a ratio shown in Table 3 was put into a reaction vessel having a volume of 0.5 L. Then, a mixture of 280 g of water, 1.6 g of tribasic calcium phosphate and 0.4 g of hydroxypropylmethyl cellulose, which serve as dispersing agents, 0.02 g of α-methylstyrene dimer serving as a molecular weight regulator, and 0.66 g of di(3,5,5-trimethylhexanoyl) peroxide serving as a radical polymerization initiator was put into the reaction vessel, and a reaction was performed at 70° C. for 3 hours under agitation. Subsequently, 0.1 g of potassium perfulfate serving as the radical polymerization initiator was dissolved into 0.5 g of water and was put into the reaction vessel and the reaction was performed at 70° C. for 1 hour. Thereafter, cooling to 40° C. was performed, and a filtration step and a drying step were performed so as to produce a surface physical property modifier composition.

TABLE 1

| Type | Product name | Manufacturer | Content of component (C) |
|---|---|---|---|
| a1 paraffin wax | Paraffin wax155 | NIPPON SEIRO CO., LTD. | mixture of C6 to C10 aliphatic hydrocarbon: 0.06 parts by mass relative to 100 parts by mass of (a1) |
| a2 microcrystalline wax | 155° Microwax | JX Nippon Oil & Energy Corporation | mixture of C5 to C14 aliphatic hydrocarbon: 0.8 parts by mass relative to 100 parts by mass of (a2) |
| a3 Fischer-Tropsch wax | FT-0165 | NIPPON SEIRO CO., LTD. | mixture of C5 to C8 aliphatic hydrocarbon: 0.01 parts by mass relative to 100 parts by mass of (a3) |
| a4 polyethylene wax | WEISSEN-0373 | NIPPON SEIRO CO., LTD. | none |

TABLE 2

| | |
|---|---|
| b1 | acrylonitrile |
| b2-1 | acrylic acid |
| b2-2 | methacrylic acid |
| b3-1 | 2-hydroxyethyl methacrylate |
| b3-2 | 2-hydroxypropyl methacrylate |
| b4 | styrene |
| b5-1 | methyl methacrylate |
| b5-2 | butyl methacrylate |
| b5-3 | ethyl acrylate |
| b5-4 | n-butyl acrylate |
| b5-5 | methoxyethyl acrylate |
| b6 | α-butyl-ω-(3-methacryloxypropyl)polydimethylsiloxane |

TABLE 3

| | Surface physical property modifier composition | | | | | | | | | | | | | |
|---|---|---|---|---|---|---|---|---|---|---|---|---|---|---|
| | Wax (A) | | | | Total amount of (A) | Vinyl (co)polymer (B) | | | | | | | |
| | | | | | | | b2 | | b3 | | | b5 | | |
| Example or comparative example | a1 parts by mass | a2 parts by mass | a3 parts by mass | a4 parts by mass | parts by mass | b1 parts by mass | b2-1 parts by mass | b2-2 parts by mass | b3-1 parts by mass | b3-2 parts by mass | b4 parts by mass | b5-1 parts by mass | b5-2 parts by mass | b5-3 parts by mass |
| Example 1-1-1 | | 50 | | | 50 | 50 | | | | | | | | |
| Example 1-1-2 | | 98 | | | 98 | | | | | | | | 2 | |
| Example 1-1-3 | 70 | | | | 70 | | 30 | | | | | | | |
| Example 1-1-4 | | 70 | | | 70 | | | | 30 | | | | | |
| Example 1-1-5 | | | 70 | | 70 | | | | | | 30 | | | |
| Example 1-1-6 | | | | 70 | 70 | | | | | | 10 | 10 | | |
| Example 1-1-7 | | 65 | 5 | | 70 | 3 | | | | | | | | 27 |
| Example 1-1-8 | 63 | | | 7 | 70 | 9 | | | | | | 21 | | |
| Example 1-1-9 | | | 70 | | 70 | 15 | | | | | | 15 | | |
| Comparative example 1-1-1 | 100 | | | | 100 | | | | | | | | | |
| Comparative example 1-1-2 | 40 | | | 5 | 45 | 16.5 | | | | | | 38.5 | | |
| Comparative example 1-1-3 | | | 70 | | 70 | 9 | | | | | | 21 | | |
| Comparative example 1-1-4 | | 70 | | | 70 | 9 | | | | | | 21 | | |
| Example 1-2-1 | 50 | | | | 50 | 35 | | | | | | | | |
| Example 1-2-2 | | 98 | | | 98 | | | | | | | | 29.7 | |
| Example 1-2-3 | 70 | | | | 70 | | | | | | | | | |
| Example 1-2-4 | | | | 70 | 70 | 3 | | | | | | | 24 | |
| Example 1-2-5 | | 70 | | | 70 | | | | | 2.7 | | 24.3 | | |
| Example 1-2-6 | | 70 | | | 70 | 3 | | | | | 7 | | | |
| Example 1-2-7 | 63 | | | 7 | 70 | 7 | | | | | | 20 | | |
| Example 1-2-8 | | 50 | | | 50 | 5 | | | | | | 30 | | |
| Example 1-2-9 | | | 70 | | 70 | 1.7 | | | | | | 28 | | |
| Comparative example 1-2-1 | | | | | 0 | 27 | | | | | | 63 | | |
| Comparative example 1-2-2 | | 99 | | | 99 | 0.27 | | | | | | 0.63 | | |
| Comparative example 1-2-3 | 40 | | | 5 | 45 | 16.5 | | | | | | 37.4 | | |

TABLE 3-continued

| | | | | |
|---|---|---|---|---|
| Comparative example 1-2-4 | 70 | 70 | 2.7 | 18 |

| | Surface physical property modifier composition | | | | | | | | | |
|---|---|---|---|---|---|---|---|---|---|---|
| | Vinyl (co)polymer (B) | | | | | C5 to C14 Hydrocarbon (C) | | | | |
| | b5 | | b6 | Total amount of (B) | Ratio of b6 relative to (B) | (A) + (B) | Material contained in wax mixture | | Material added to (A) | | Ratio relative to (A) |
| Example or comparative example | b5-4 parts by mass | b5-5 parts by mass | parts by mass | parts by mass | percent by mass | parts by mass | Type | parts by mass | Type | parts by mass | percent by mass |
| Example 1-1-1 | | | 0 | 50 | 0 | 100 | C5-C14 | 0.4 | | | 0.8 |
| Example 1-1-2 | | | 0 | 2 | 0 | 100 | C5-C14 | 0.8 | C6 | 0.1 | 0.9 |
| Example 1-1-3 | | | 0 | 30 | 0 | 100 | C6-C10 | 0.04 | | | 0.06 |
| Example 1-1-4 | | | 0 | 30 | 0 | 100 | C5-C14 | 0.6 | | | 0.9 |
| Example 1-1-5 | | | 0 | 30 | 0 | 100 | C6-C10 | 0.03 | | | 0.04 |
| Example 1-1-6 | 10 | | 0 | 30 | 0 | 100 | | | C6 | 0.001 | 0.001 |
| Example 1-1-7 | | | 0 | 30 | 0 | 100 | C5-C14 | 0.7 | | | 1 |
| Example 1-1-8 | | | 0 | 30 | 0 | 100 | C6-C10 | 0.04 | | | 0.05 |
| Example 1-1-9 | | | 0 | 30 | 0 | 100 | C6-C10 | 0.03 | | | 0.04 |
| Comparative example 1-1-1 | | | 0 | 0 | — | 100 | C6-C10 | 0.06 | | | 0.06 |
| Comparative example 1-1-2 | | | 0 | 55 | 0 | 100 | C6-C10 | 0.02 | C8 | 0.03 | 0.1 |
| Comparative example 1-1-3 | | | 0 | 30 | 0 | 100 | | | | | — |
| Comparative example 1-1-4 | | | 0 | 30 | 0 | 100 | C5-C8 | 0.6 | C12 | 0.5 | 1.6 |
| Example 1-2-1 | | | 15 | 50 | 30 | 100 | C6-C10 | 0.03 | C14 | 0.005 | 0.07 |
| Example 1-2-2 | | 1.8 | 0.2 | 2 | 10 | 100 | C5-C8 | 0.01 | C14 | 0.001 | 0.01 |
| Example 1-2-3 | | | 0.3 | 30 | 1 | 100 | C6-C10 | 0.04 | | | 0.06 |
| Example 1-2-4 | | | 3 | 30 | 10 | 100 | | | C10 | 0.001 | 0.001 |
| Example 1-2-5 | | | 3 | 30 | 10 | 100 | C5-C14 | 0.6 | C8 | 0.1 | 1 |
| Example 1-2-6 | 17 | | 3 | 30 | 10 | 100 | C5-C8 | 0.01 | | | 0.01 |
| Example 1-2-7 | | | 3 | 30 | 10 | 100 | C6-C10 | 0.04 | | | 0.05 |
| Example 1-2-8 | | | 15 | 50 | 30 | 100 | C5-C14 | 0.4 | | | 0.8 |
| Example 1-2-9 | | | 0.3 | 30 | 1 | 100 | C5-C8 | 0.01 | C5 | 0.02 | 0.03 |
| Comparative example 1-2-1 | | | 10 | 100 | 10 | 100 | | | | | — |
| Comparative example 1-2-2 | | | 0.1 | 1 | 10 | 100 | C5-C14 | 0.8 | | | 0.8 |
| Comparative example 1-2-3 | | | 1.1 | 55 | 2 | 100 | C6-C10 | 0.02 | C8 | 0.03 | 0.1 |
| Comparative example 1-2-4 | | | 9.3 | 30 | 31 | 100 | | | C12 | 0.7 | 1 |

(PC/ABS Resin Molded Article)

The surface physical property modifier composition produced as described above was mixed in a ratio shown in Table 4 relative to 100 parts by mass of Bayblend T65XF 901510 (produced by Bayer) serving as the PC/ABS resin, and melt-kneading was performed with a twin screw extruder (PCM-30, produced by Ikegai Corporation) at an extrusion temperature of 240° C. so as to produce pellets of a thermoplastic resin composition. Subsequently, the resulting pellets were injection-molded at a cylinder temperature of 240° C. and a mold temperature of 80° C. so as to form a JIS K 7113 No. 1 test piece and a plate-like test piece of 55 mm×80 mm×t of 2 mm.

Regarding each of the resulting test pieces, the molding appearance, the anti-scratch property, and the squeak noise were evaluated by the following methods. The results thereof are shown in Table 4.

<Molding Appearance>

Appearance of the injection-molded article was visually judged on the criteria described below.

⊚: The color is white and there are no injection variations, e.g., a flow mark, on the surface of the molded article.

◯: The color is white and there are almost no injection variations, e.g., a flow mark, on the surface of the molded article.

x: The color is other than white, or there are injection variations, e.g., a flow mark, on the surface of the molded article. In this regard, the flow mark refers to poor appearance where circular ripples are formed around a gate of the molded article.

(Anti-Scratch Property)

Scratch Tester KK-01 produced by KATO TECH CO., LTD., was used as the apparatus, a JIS K 7113 No. 1 test piece was used as the test piece, and the test was performed in accordance with ISO 19252, where a scratch load was 1 to 30 N, a scratch distance was 100 mm, a scratch rate was 100 mm/sec, and a tip was stainless steel with a diameter of 1.0 mm. The load, at which a white blush mark was imparted for the first time, was specified as the evaluation point of the anti-scratch property.

<Squeak Noise>

A method shown in, for example, Japanese Patent No. 5425535 can be adopted for evaluation of squeak noise. Stick-Slip Test Stand SSP-02 produced by Ziegler was used as the apparatus, and a plate-like test piece of 55 mm×80 mm×t of 2 mm was used as the test piece. Regarding a counter material, a test piece of 55 mm×80 mm×t of 2 mm was prepared by injection-molding a PC/ABS resin. The test piece was fixed to the apparatus and was rubbed against the counter material three times under each of the conditions of a load of 5 N, 10 N, and 40 N and a velocity of 1 mm/sec, 4 mm/sec, and 10 mm/sec so as to measure the squeak noise risk value (RPN). The squeak noise were judged on the following criteria in accordance with the standards of Verband der Deutchen Automobilindustrie e.V. In this regard, the RPN is expressed in 10 ranks of 1 to 10 by the apparatus.

○: RPN of 1 to 3
x: RPN of 4 to 10 ratios of the surface physical property modifier composition, when example 2-1-1 to 2-1-11 are compared, the results of the effect of improving the anti-scratch property were good in example 2-1-2 to example 2-1-11 in which the mixing ratios of the surface physical property modifier composition relative to 100 parts by mass of PC/ABS were 1 to 20 parts by mass. Likewise, when example 2-2-1 to 2-2-11 are compared, the results of the effect of improving the anti-

TABLE 4

| Example or comparative example | Thermoplastic resin composition | | | Evaluation result of resin molded article | | | |
|---|---|---|---|---|---|---|---|
| | PC/ABS resin parts by mass | Surface physical property modifier composition | | Molding appearance | Anti-scratch property N | Squeak noise | |
| | | Type | parts by mass | | | RPN | Judgement |
| Example 2-1-1 | 100 | Example 1-1-1 | 0.1 | ○ | 12.1 | 2 | ○ |
| Example 2-1-2 | 100 | Example 1-1-1 | 1 | ○ | 15.1 | 2 | ○ |
| Example 2-1-3 | 100 | Example 1-1-1 | 20 | ○ | 15.5 | 2 | ○ |
| Example 2-1-4 | 100 | Example 1-1-2 | 5 | ○ | 15.6 | 2 | ○ |
| Example 2-1-5 | 100 | Example 1-1-3 | 5 | ○ | 14.7 | 2 | ○ |
| Example 2-1-6 | 100 | Example 1-1-4 | 5 | ○ | 14.7 | 2 | ○ |
| Example 2-1-7 | 100 | Example 1-1-5 | 5 | ○ | 15.0 | 2 | ○ |
| Example 2-1-8 | 100 | Example 1-1-6 | 5 | ○ | 15.0 | 2 | ○ |
| Example 2-1-9 | 100 | Example 1-1-7 | 5 | ○ | 14.9 | 2 | ○ |
| Example 2-1-10 | 100 | Example 1-1-8 | 5 | ○ | 16.0 | 2 | ○ |
| Example 2-1-11 | 100 | Example 1-1-9 | 5 | ○ | 16.1 | 2 | ○ |
| Example 2-2-1 | 100 | Example 1-2-1 | 0.1 | ⊙ | 17.2 | 1 | ○ |
| Example 2-2-2 | 100 | Example 1-2-1 | 1 | ⊙ | 20.0 | 1 | ○ |
| Example 2-2-3 | 100 | Example 1-2-1 | 20 | ⊙ | 21.0 | 1 | ○ |
| Example 2-2-4 | 100 | Example 1-2-2 | 5 | ⊙ | 20.2 | 1 | ○ |
| Example 2-2-5 | 100 | Example 1-2-3 | 5 | ⊙ | 20.5 | 1 | ○ |
| Example 2-2-6 | 100 | Example 1-2-4 | 5 | ⊙ | 20.4 | 1 | ○ |
| Example 2-2-7 | 100 | Example 1-2-5 | 5 | ⊙ | 19.9 | 1 | ○ |
| Example 2-2-8 | 100 | Example 1-2-6 | 5 | ⊙ | 20.2 | 1 | ○ |
| Example 2-2-9 | 100 | Example 1-2-7 | 5 | ⊙ | 22.3 | 1 | ○ |
| Example 2-2-10 | 100 | Example 1-2-8 | 5 | ⊙ | 22.3 | 1 | ○ |
| Example 2-2-11 | 100 | Example 1-2-9 | 5 | ⊙ | 22.2 | 1 | ○ |
| Comparative example 2-1-1 | 100 | none | 0 | ○ | 2.1 | 8 | X |
| Comparative example 2-1-2 | 100 | Example 1-1-1 | 0.05 | ○ | 3.0 | 7 | X |
| Comparative example 2-1-3 | 100 | Example 1-1-1 | 21 | X | 15.6 | 1 | ○ |
| Comparative example 2-2-1 | 100 | Example 1-2-1 | 0.05 | ⊙ | 8.6 | 6 | X |
| Comparative example 2-2-2 | 100 | Example 1-2-1 | 21 | X | 21.0 | 1 | ○ |
| Comparative example 2-3-1 | 100 | Comparative example 1-1-1 | 5 | X | 16.2 | 2 | ○ |
| Comparative example 2-3-2 | 100 | Comparative example 1-1-2 | 5 | ○ | 5.5 | 5 | X |
| Comparative example 2-3-3 | 100 | Comparative example 1-1-3 | 5 | ○ | 12.2 | 7 | X |
| Comparative example 2-3-4 | 100 | Comparative example 1-1-4 | 5 | X | 16.5 | 5 | X |
| Comparative example 2-4-1 | 100 | Comparative example 1-2-1 | 5 | ○ | 2.3 | 8 | X |
| Comparative example 2-4-2 | 100 | Comparative example 1-2-2 | 5 | X | 21.9 | 1 | ○ |
| Comparative example 2-4-3 | 100 | Comparative example 1-2-3 | 5 | ○ | 6.6 | 6 | X |
| Comparative example 2-4-4 | 100 | Comparative example 1-2-4 | 5 | X | 21.9 | 1 | ○ |

As is clear from the results shown in Table 4, the PC/ABS resin molded article including the surface physical property modifier composition according to each of the examples had good effects of improving the anti-scratch property and reducing squeak noise. Importantly, the PC/ABS resin molded articles including surface physical property modifier compositions produced by copolymerization of the vinyl monomer (b6), as in example 2-2-1 to example 2-2-11, had particularly good effects. Meanwhile, regarding the mixing scratch property were good in example 2-2-2 to example 2-2-11 in which the mixing ratios of the surface physical property modifier composition relative to 100 parts by mass of PC/ABS were 1 to 20 parts by mass.

On the other hand, in comparative example 2-1-1, the anti-scratch property and the squeak noise were degraded because the surface physical property modifier composition was not used. In comparative example 2-1-2 and comparative example 2-2-1, the anti-scratch property and the squeak noise were degraded because the contents of the surface physical property modifier composition were too small. Conversely, in comparative example 2-1-3 and comparative example 2-2-2, the molding appearance was poor because the contents of the surface physical property modifier composition were excessive. In comparative example 2-3-1, the molding appearance was poor because the surface physical property modifier composition, in which component (B) was not contained, according to comparative example 1-1-1 was used. In comparative example 2-3-2, the anti-scratch property and the squeak noise were degraded because the surface physical property modifier composition, in which the content of component (A) was too small, according to comparative example 1-1-2 was used. In comparative example 2-3-3, the squeak noise was degraded because the surface physical property modifier composition, in which component (C) was not contained, according to comparative example 1-1-3 was used. In comparative example 2-3-4, the molding appearance and the squeak noise was degraded because the surface physical property modifier composition, in which the content of component (C) was excessive, according to comparative example 1-1-4 was used. In comparative example 2-4-1, the anti-scratch property and the squeak noise were degraded because the surface physical property modifier composition, in which component (A) was not contained, according to comparative example 1-2-1 was used. Conversely, in comparative example 2-4-2, the molding appearance was poor because the surface physical property modifier composition, in which the content of component (A) was excessive, according to comparative example 1-2-2 was used. In comparative example 2-4-3, the anti-scratch property and the squeak noise were degraded because the surface physical property modifier composition, in which the content of component (A) was too small, according to comparative example 1-2-3 was used. In comparative example 2-4-4, the molding appearance was poor because comparative example 1-2-4, in which the proportion of (b6) in component (B) was excessive, was used.

The invention claimed is:
1. A thermoplastic resin composition comprising 0.1 to 20 parts by mass of the surface physical property modifier composition relative to 100 parts by mass of thermoplastic resin composed of
5 to 95 parts by mass of polycarbonate resin (PC) and
5 to 95 parts by mass of acrylonitrile-butadiene-styrene copolymer resin (ABS),
wherein the surface physical property modifier composition comprises (A) a wax, (B) a vinyl (co)polymer, and (C) an aliphatic hydrocarbon having a carbon number of 5 to 14,
wherein the component (A) is at least one selected from the group consisting of (a1) paraffin wax, (a2) microcrystalline wax, (a3) Fischer-Tropsch wax, and (a4) polyethylene wax,
wherein the component (B) is produced by radical polymerization of at least one vinyl monomer selected from the group consisting of (b1) a (meth)acrylonitrile, (b2) a (meth)acrylic acid, (b3) a hydroxyethyl (meth)acrylate or hydroxypropyl (meth)acrylate, (b4) styrene, and (b5) (meth)acrylic acid alkyl esters denoted by formula (1) below, wherein the component (A) is 50 to 98 parts by mass relative to 100 parts by mass of a total of the component (A) and the component (B), and
the component (C) is 0.001 to 1 percent by mass relative to a total amount of the component (A)

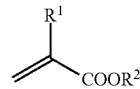

formula (1)

($R^1$: H or $CH_3$ and $R^2$: a straight chain or branched hydrocarbon group having a carbon number of 1 to 4).

2. A resin molded article produced by molding the thermoplastic resin composition according to claim 1 into a predetermined shape.

3. A thermoplastic resin composition comprising 0.1 to 20 parts by mass of the surface physical property modifier composition relative to 100 parts by mass of thermoplastic resin composed of
5 to 95 parts by mass of polycarbonate resin (PC) and
5 to 95 parts by mass of acrylonitrile-butadiene-styrene copolymer resin (ABS),
wherein the surface physical property modifier composition comprises (A) a wax, (B) a vinyl (co)polymer, and (C) an aliphatic hydrocarbon having a carbon number of 5 to 14,
wherein the component (A) is at least one selected from the group consisting of (a1) paraffin wax, (a2) microcrystalline wax, (a3) Fischer-Tropsch wax, and (a4) polyethylene wax,
wherein the component (B) is a vinyl copolymer produced by radical polymerization of at least one vinyl monomer selected from the group consisting of (b1) a (meth)acrylonitrile, (b2) a (meth)acrylic acid, (b3) a hydroxyethyl (meth)acrylate or hydroxypropyl (meth)acrylate, (b4) styrene, and (b5) (meth)acrylic acid alkyl esters denoted by formula (1) below and (b6) a vinyl monomer having a polyorganosiloxane group and a vinyl group at one or more ends of the molecule,
wherein the component (A) is 50 to 98 parts by mass relative to 100 parts by mass of a total of the component (A) and the component (B), and
the component (C) is 0.001 to 1 percent by mass relative to a total amount of the component (A), and the proportion of the monomer (b6) in the component (B) is 1 to 30 percent by mass

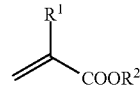

formula (1)

($R^1$: H or $CH_3$ and $R^2$: a straight chain or branched hydrocarbon group having a carbon number of 1 to 4).

4. A resin molded article produced by molding the thermoplastic resin composition according to claim 3 into a predetermined shape.

* * * * *